United States Patent
Au et al.

(10) Patent No.: US 11,284,450 B2
(45) Date of Patent: Mar. 22, 2022

(54) SYSTEM AND METHOD FOR TRANSMISSION IN A GRANT-FREE UPLINK TRANSMISSION SCHEME

(71) Applicants: Kelvin Kar Kin Au, Ottawa (CA); Liqing Zhang, Ottawa (CA); Jianglei Ma, Ottawa (CA)

(72) Inventors: Kelvin Kar Kin Au, Ottawa (CA); Liqing Zhang, Ottawa (CA); Jianglei Ma, Ottawa (CA)

(73) Assignee: HUAWEI TECHNOLOGIES CO., LTD., Shezhen (CN)

( * ) Notice: Subject to any disclaimer, the term of this patent is extended or adjusted under 35 U.S.C. 154(b) by 11 days.

(21) Appl. No.: 16/907,876

(22) Filed: Jun. 22, 2020

(65) Prior Publication Data
US 2020/0322995 A1    Oct. 8, 2020

Related U.S. Application Data

(63) Continuation of application No. 15/989,810, filed on May 25, 2018, now Pat. No. 10,721,776, which is a
(Continued)

(51) Int. Cl.
- H04W 74/08    (2009.01)
- H04W 72/04    (2009.01)
- H04L 1/18     (2006.01)

(52) U.S. Cl.
CPC ....... *H04W 74/0841* (2013.01); *H04W 72/04* (2013.01); *H04L 1/1861* (2013.01)

(58) Field of Classification Search
CPC .. H04W 74/0841; H04W 72/04; H04L 1/1861
See application file for complete search history.

(56) References Cited

U.S. PATENT DOCUMENTS

| 9,532,388 B2 * | 12/2016 | Panchal | .............. H04L 1/08 |
| 9,750,056 B2 * | 8/2017 | Au | ............. H04W 72/04 |

(Continued)

FOREIGN PATENT DOCUMENTS

| CN | 102158932 A | 8/2011 |
| EP | 2688336 A1 | 1/2014 |

(Continued)

OTHER PUBLICATIONS

International Search Report, PCT/CN2016/071973, dated Apr. 18, 2016.
(Continued)

*Primary Examiner* — Michael J Moore, Jr.

(57) ABSTRACT

A system and method includes implementing, by a base station (BS), a reliable ultra-low latency transmission mechanism in a grant-free uplink transmission scheme having defined therein contention transmission unit (CTU) access regions and a plurality of CTUs. Implementing the reliable ultra-low latency transmission mechanism includes defining a reliable ultra-low latency CTU (RULL-CTU) access region from a portion of the CTU access regions of the grant-free transmission scheme, defining an RULL-CTU mapping scheme by mapping at least a portion of plurality of CTUs to the RULL-CTU access region to define a plurality of RULL-CTUs, defining a reliable ultra-low latency user equipment (RULL-UE) mapping scheme by defining rules for mapping a plurality of RULL-UEs to the plurality of RULL-CTUs in an initial pattern for initial transmissions in a first transmission time interval (TTI), and a regrouped pattern for redundant transmissions in a second TTI subsequent to the first TTI.

20 Claims, 7 Drawing Sheets

Related U.S. Application Data continuation of application No. 15/656,199, filed on Jul. 21, 2017, now Pat. No. 10,149,327, which is a continuation of application No. 14/606,665, filed on Jan. 27, 2015, now Pat. No. 9,750,056.

(56) References Cited

U.S. PATENT DOCUMENTS

| | | | |
|---|---|---|---|
| 10,075,270 | B2 | 9/2018 | Srinivas et al. |
| 10,149,327 | B2 * | 12/2018 | Au .................. H04W 72/04 |
| 10,721,776 | B2 * | 7/2020 | Au .................. H04W 74/0841 |
| 11,122,609 | B2 * | 9/2021 | Ma .................. H04L 1/1893 |
| 2005/0239441 | A1 | 10/2005 | Eronen |
| 2009/0092086 | A1 | 4/2009 | Lee et al. |
| 2011/0292895 | A1 | 12/2011 | Wager et al. |
| 2014/0044061 | A1 | 2/2014 | Yue et al. |
| 2014/0192767 | A1 * | 7/2014 | Au .................. H04W 72/042 370/330 |
| 2014/0254544 | A1 | 9/2014 | Kar Kin Au et al. |
| 2014/0269663 | A1 | 9/2014 | Nikopour et al. |
| 2014/0369434 | A1 | 12/2014 | Taherzadehboroujeni et al. |
| 2015/0195854 | A1 | 7/2015 | Jianchi et al. |
| 2016/0095133 | A1 | 3/2016 | Hwang et al. |
| 2016/0127092 | A1 | 5/2016 | Zhi |
| 2016/0233994 | A1 | 8/2016 | Prasad et al. |
| 2016/0286560 | A1 | 9/2016 | Gao et al. |
| 2016/0344641 | A1 | 11/2016 | Javidi et al. |
| 2017/0099121 | A1 | 4/2017 | Uchino et al. |
| 2017/0325269 | A1 | 11/2017 | Au et al. |
| 2018/0123765 | A1 * | 5/2018 | Cao .................. H04L 1/1671 |
| 2018/0124816 | A1 * | 5/2018 | Han .................. H04L 1/1893 |
| 2018/0139774 | A1 * | 5/2018 | Ma .................. H04W 72/1289 |
| 2018/0295651 | A1 * | 10/2018 | Cao .................. H04W 74/0833 |

FOREIGN PATENT DOCUMENTS

| | | |
|---|---|---|
| EP | 3068180 A1 | 9/2016 |
| GN | 1996806 A | 7/2007 |
| JP | 2005286753 A | 10/2005 |
| JP | 2012105342 A | 5/2012 |
| JP | 2017502552 A | 1/2017 |
| KR | 20070007373 A | 1/2007 |
| WO | 2011022160 A1 | 2/2011 |
| WO | 2013127634 A1 | 9/2013 |
| WO | 2014090200 A1 | 6/2014 |
| WO | 2014135126 A1 | 9/2014 |
| WO | 2015005701 A1 | 1/2015 |
| WO | 2015067196 A1 | 5/2015 |

OTHER PUBLICATIONS

R1-092627 Qualcomm Europe, "Link Analysis of 2ms TTI UL Range Extension Schemes", 3GPP TSG WG1 Meeting #57bis Jun. 29-Jul. 3, 2009 Los Angeles, CA, USA, 8 pages.

Uplink Contention Based SCMA for 5G Radio Access, Global 2014 Workshop—Emerging Technologies for 5G Wireless Cellular Networks, Dec. 12, 2014.

* cited by examiner

SYSTEM AND METHOD FOR TRANSMISSION IN A GRANT-FREE UPLINK TRANSMISSION SCHEME

CROSS REFERENCE TO RELATED APPLICATIONS

The present disclosure is a continuation of U.S. patent application Ser. No. 15/989,810 filed May 25, 2018, which is a continuation of U.S. patent application Ser. No. 15/656,199, filed Jul. 21, 2017, which is a continuation of U.S. patent application Ser. No. 14/606,665, filed Jan. 27, 2015, the entireties of which are hereby incorporated by reference.

FIELD

The present disclosure relates a system and method for reliable low latency transmission mechanism in a grant-free uplink transmission scheme for wireless communication.

BACKGROUND

In a typical wireless network such as a long-term evolution (LTE) network, the selection of shared data channels for uplink is scheduling/grant based, and the scheduling and grant mechanisms are controlled by a base station (BS) in the network. A user equipment (UE) sends an uplink scheduling request to the BS. When the BS receives the scheduling request, the BS sends an uplink grant to the UE indicating its uplink resource allocation. The UE then transmits data on the granted resource.

SUMMARY

In some aspects, the present disclosure describes a method including mapping a first user equipment (UE) for uplink transmission to first time-frequency regions of a frequency partition. The method also includes configuring the first UE, using high-level signaling, to perform a configured first number of uplink transmissions including an initial transmission and at least one retransmission irrespective of whether the initial transmission was successfully received, using time-frequency regions indicated by said mapping.

In any of the preceding aspects/embodiments, the configured first number of uplink transmissions may be a configured first number of uplink grant-free transmissions.

In any of the preceding aspects/embodiments, the method may also include configuring the first UE to perform frequency hopping between an initial transmission and a retransmission.

In any of the preceding aspects/embodiments, the configured first number of uplink transmissions may be determined based on a reliability mode of the first UE.

In any of the preceding aspects/embodiments, each first time-frequency region may be a contention transmission unit (CTU) access region further defined by a signature and a pilot.

In some aspects, the present disclosure describes a method performed by a user equipment (UE). The method includes receiving, by high-level signaling, a mapping of the UE for uplink transmission to first time-frequency regions of a frequency partition. The method also includes performing a configured first number of uplink transmissions including an initial transmission and at least one retransmission irrespective of whether the initial transmission was successfully received, using time-frequency regions indicated by said mapping.

In any of the preceding aspects/embodiments, the configured first number of uplink transmissions may be a configured first number of uplink grant-free transmissions.

In any of the preceding aspects/embodiments, the method may also include performing frequency hopping between an initial transmission and a retransmission.

In any of the preceding aspects/embodiments, the configured first number of uplink transmissions may be determined based on a reliability mode of the UE.

In any of the preceding aspects/embodiments, each first time-frequency region may be a contention transmission unit (CTU) access region further defined by a signature and a pilot.

In some aspects, the present disclosure describes a base station including a processor, and a non-transitory computer-readable memory storing thereon instructions. The instructions, when executed, cause the processor to: map a first user equipment (UE) for uplink transmission to first time-frequency regions of a frequency partition. The instructions, when executed, further cause the processor to configure the first UE, using high-level signaling, to perform a configured first number of uplink transmissions including an initial transmission and at least one retransmission irrespective of whether the initial transmission was successfully received, using time-frequency regions indicated by said mapping.

In any of the preceding aspects/embodiments, the configured first number of uplink transmissions may be a configured first number of uplink grant-free transmissions.

In any of the preceding aspects/embodiments, the instructions may, when executed, further cause the processor to configure the first UE to perform frequency hopping between an initial transmission and a retransmission.

In any of the preceding aspects/embodiments, the configured first number of uplink transmissions may be determined based on a reliability mode of the first UE.

In any of the preceding aspects/embodiments, each first time-frequency region may be a contention transmission unit (CTU) access region further defined by a signature and a pilot.

In some aspects, the present disclosure describes a user equipment (UE) including a processor, and a non-transitory computer-readable memory storing thereon instructions. The instructions, when executed, cause the processor to receive, by high-level signaling, a mapping of the UE for uplink transmission to first time-frequency regions of a frequency partition. The instructions, when executed, further cause the processor to perform a configured first number of uplink transmissions including an initial transmission and at least one retransmission irrespective of whether the initial transmission was successfully received, using time-frequency regions indicated by said mapping.

In any of the preceding aspects/embodiments, the configured first number of uplink transmissions may be a configured first number of uplink grant-free transmissions.

In any of the preceding aspects/embodiments, the instructions may, when executed, further cause the processor to perform frequency hopping between an initial transmission and a retransmission.

In any of the preceding aspects/embodiments, the configured first number of uplink transmissions may be determined based on a reliability mode of the UE.

In any of the preceding aspects/embodiments, each first time-frequency region may be a contention transmission unit (CTU) access region further defined by a signature and a pilot.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, embodiments of the present disclosure provide a method and system for a reliable ultra-low latency (RULL) transmission mechanism in a grant-free uplink transmission scheme. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Various embodiments are described herein in the context of a long-term evolution (LTE) wireless network. However, various embodiments may also be applied to other wireless networks including, for example, worldwide interoperability for microwave access (WiMAX) networks, or future wireless network, for example, future cellular network without cell ID for cells.

Figure 1:
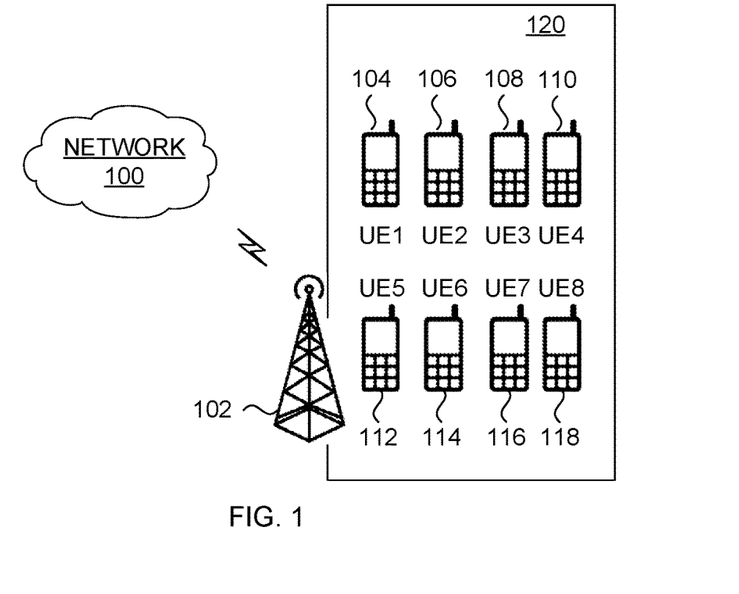
FIG. 1 is a block diagram of a network on which various embodiments may be implemented.

Referring to FIG. 1, a schematic diagram of a network 100 is shown. A base station (BS) 102 provides uplink and downlink communication with the network 100 for a plurality of user equipment (UEs) 104-118 within a coverage area 120 of the BS 102. The BS 102 may be, for example, a cell tower. FIG. 1 shows one BS 102 and eight UEs 104-118 for illustrative purposes, however a network 100 may include more than one BS 102 and the coverage area 120 of the BS 102 may include more or less than eight UEs 104-118 in communication with the BS 102.

The BS 102 implements a grant-free uplink transmission scheme in which contention transmission unit (CTU) access regions are defined. Each CTU access region may include a number of CTUs. A CTU is a basic resource, predefined by the network 100, for contention transmissions. Each CTU may be a combination of time, frequency, code-domain, and/or pilot elements. Code-domain elements may be, for example, CDMA (code division multiple access) codes, LDS (low-density signature) signatures, SCMA (sparse code multiple access) codebooks, and the like. These possible code-domain elements are referred to generically as "signatures" hereinafter. Multiple UEs may contend for the same CTU. The size of a CTU may be preset by the network 100 and may take into account an expected transmission size, the amount of desired padding, and/or modulation coding scheme (MCS) levels. The grant-free uplink transmission scheme may be defined by the BS 102, or it may be set in a wireless standard (e.g., 3GPP). A detailed description of an example grant-free uplink transmission scheme and method may be found in U.S. patent application Ser. No. 13/790,673 filed on Mar. 8, 2013, entitled "System and Method for Uplink Grant-Free Transmission Scheme", which application is hereby incorporated herein by reference.

Sparse code multiple access (SCMA) is a non-orthogonal waveform with near optimal spectral efficiency that utilizes the shaping gain of multi-dimensional constellation. The utilization of non-orthogonal waveforms in SCMA enables the creation of a multiple-user multiple access scheme in which sparse codewords of multiple layers or users are overlaid in code and power domains and carried over shared time-frequency resources. The system is overloaded if the number of overlaid layers is more than the length of multiplexed codewords. Overloading is achievable with moderate complexity of detection due to the sparseness of SCMA codewords. In SCMA, coded bits are directly mapped to multi-dimensional sparse codewords selected from layer-specific SCMA codebooks. The major factors that control the complexity of the SCMA include the sparseness level of codewords, and the multi-dimensional constellations with a low number of projection points per dimension. Due to these benefits, SCMA is a technology suitable for supporting massive connectivity. Furthermore, a blind multi-user reception technique using Message Parsing Algorithm (MPA) can be applied to detect users' activities and the information carried by them simultaneously. With such blind detection capability, grant-free multiple access can be supported. A detailed description of SCMA schemes may be found in U.S. patent application Ser. No. 13/919,918 filed Jun. 17, 2013, entitled System and Method for Designing and Using Multidimensional Constellations, which application is incorporated herein by reference. A detailed description of a MPA receiver may be found in U.S. patent application Ser. No. 14/212,583 filed Mar. 14, 2014, entitled Low Complexity Receiver and Method for Low Density Signature Modulation, which application is hereby incorporated herein by reference.

Figure 2:
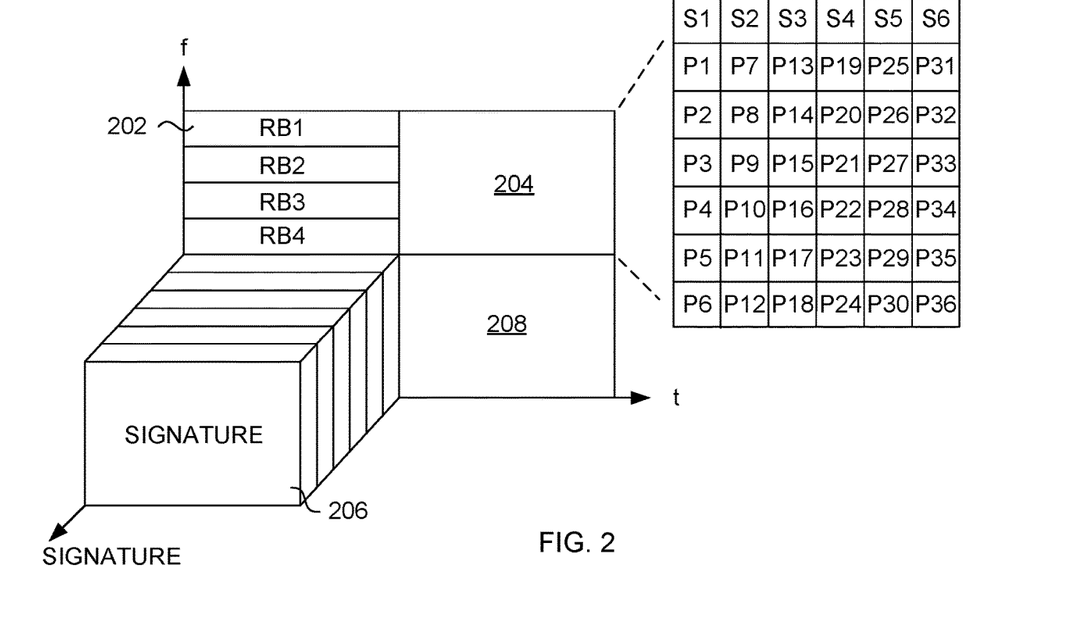
FIG. 2 is a schematic diagram of an example configuration of various contention transmission unit (CTU) access units according to an embodiment.

Referring to FIG. 2, a schematic diagram of an example of defining CTU resources within various CTU access regions in a grant-free uplink transmission scheme is shown.

In the example, the available bandwidth of a BS 102 is divided into time-frequency regions that define the CTU access regions. In the example shown in FIG. 2, four CTU access regions 202-208 are defined. Each CTU access region 202-208 occupies a predefined number of resource blocks (RBs) of the available bandwidth. The CTU access region 202, for example, occupies four resource blocks RB1-RB4. In FIG. 2, CTUs are mapped identically to access regions 202-208, but varying views of this mapping are shown for illustrative purposes.

The frequency-time regions occupied by each CTU access region 202-208 are further broken down to support six signatures (S1-S6) and six pilots mapped to each signature to create thirty-six total pilots (P1-P36) per CTU access region 202-208. Each CTU is defined by a combination of time, frequency, signature, and pilot. In the example shown, each CTU access region 202-208 is able to support up to thirty-six UEs contending for the thirty-six CTUs defined in each region. A pilot/signature decorrelator at the BS 102 is used to detect and decode individual UE signals and transmissions.

The number of unique pilots defined in the grant-free uplink transmission scheme, e.g. the thirty-six pilots per CTU access region 202-208 in the example shown in FIG. 2, may depend on the number of UEs supported in the system. The specific numbers given in FIG. 2 are included for illustrative purposes only, and the specific configuration of the CTU access regions and CTUs, including the number of CTU access regions 202-208 and the number of CTUs within each CTU access region, may vary depending on the network.

The grant-free uplink transmission scheme may assign a unique, identifying CTU index, $I_{CTU}$, to each CTU in the CTU access regions 202-208. UEs 104-118 determine which CTU to transmit on based on mapping rules for mapping each UE 104-118 to an appropriate CTU index. The mapping rules may be defined in a default mapping scheme. The default mapping scheme may be determined by the BS 102, in which case the default mapping scheme is sent to the UEs 104-118 utilizing, for example, high-level signaling from the BS 102 when the UEs 104-118 connect to the BS 102. Alternatively, the default mapping scheme may be determined by a standard, in which case the default mapping scheme is known at the UEs 104-118 prior to the UEs 104-118 connecting to the BS 102.

Utilizing a default mapping scheme enables a UE to automatically transmit data on CTUs as soon as it enters a BS's 102 coverage area 120 without scheduling signaling between the BS 102 and the UEs. The default mapping rules may be based on, for example, a UE's dedicated connection signature (DCS), its DCS index assigned by a BS, the total number of CTUs, and/or other parameters such as subframe number.

The default mapping rules may map UEs uniformly over the available resources taking into account the size of the CTU access regions 202-208 over the time-frequency domain and the desire to reduce decoding complexity at the BS 102. The size of the CTU access regions 202-208 is taken into account so that UEs are not all mapped to the same subset of available time-frequency resources.

In a grant-free uplink transmission scheme, a collision occurs when multiple UEs simultaneously access the same CTU. In a collision the BS 102 is unable to estimate the individual channels of the UEs accessing the same CTU and, therefore, cannot decode each UE's transmission information. For example, assume two UEs (UE 104 and 106) are mapped to the same CTU and their channels are h1 and h2. If both UEs transmit simultaneously, the BS 102 can only estimate a channel of quality of h1+h2 for both UEs 104 and 106 and the transmitted information will not be decoded correctly. However, the BS 102 can implicitly determine which UEs the transmission came from based on the default mapping rules, even though the BS 102 is unable to explicitly determine which UEs were transmitting such as, for example, by resolving the headers of each of the transmissions.

In normal operation of an example grant-free uplink transmission scheme, a UE may be notified by the BS 102 when the transmission from the UE is successfully decoded through, for example, an acknowledgement (ACK). The BS 102 only sends ACK signals when transmissions are successful. Therefore, if a UE does not receive an ACK signal within a predetermined time period, the UE determines that collision has occurred and may retransmit the uplink transmission. Alternatively, the BS 102 may send a negative acknowledgement (NACK) signal to the UE when the transmission fails. In this case the UE assumes transmission was successful unless a NACK signal is received at the UE.

When a collision does occur, relying on ACK/NACK feedback at the UE creates a latency period between the time of the initial transmission and the time that the transmission is subsequently decoded because the UE waits for a predefined period without receiving an ACK signal or until receiving a NACK signal, before determining that the transmission was unsuccessful and should be retransmitted. This latency period may be, for example, 4 ms. In addition, a UE may wait an addition period after receiving ACK/NACK feedback before sending a retransmission because of, for example, a random backoff procedure implemented within the grant-free uplink transmission scheme. This additional wait period may be, for example, 4 ms.

Further, if both UEs mapped to the same CTU attempt to resolve a collision by retransmitting the signal, it is possible that the retransmissions from the UEs may again collide.

In some applications it may be undesirable to wait until the UE determines that the initial transmission was unsuccessful before resending. For example, in 5G networks for teleprotection in a smart grid or remote automation and control of health care systems, UEs may have low-latency, high-reliability transmission requirements, referred to herein as reliable ultra-low latency UEs (RULL-UEs). The latency and reliability requirements of RULL-UEs may be such that a successful transmission is desired in a time period shorter than the time for an UE to receive ACK/NACK feedback in normal operation of a grant-free uplink transmission scheme. In teleprotection in a smart grid, for example, the requirements for transmission may be less than 8 ms latency with 99.999% reliability. Thus, the desired low-latency and requirements of RULL-UEs may not be attainable in a normal operation of a grant-free uplink transmission scheme.

In order to provide improved the latency and reliability response in a grant-free uplink transmission scheme, the present disclosure provides a reliable ultra-low latency (RULL) transmission mechanism in which a RULL-UE transmits a first transmission on one of the CTUs in a first transmission time interval (TTI), then the RULL-UE automatically transmits at least one redundant transmission, each redundant transmission may be sent in a subsequent TTI on a different CTU than the initial transmission. The first redundant transmission may be sent, for example, in the TTI immediately after the TTI in which initial transmission is sent. Utilizing a RULL mechanism, the latency between transmission and redundant transmissions may be, for example, 2 ms, compared to, for example, an 8 ms latency under normal operation of a grant-free uplink transmission scheme in which a random backoff procedure is utilized, as described above.

Regrouping the CTUs that the RULL-UEs transmit on and automatically sending redundant transmissions after an initial transmission increases the probably that one of the transmissions of each RULL-UE will be decoded at the BS 102 without the RULL-UEs waiting for ACK/NACK feedback, increasing the reliability and reducing the latency of the uplink transmission compared to the normal operation of the grant-free uplink transmission scheme.

Figure 3A:
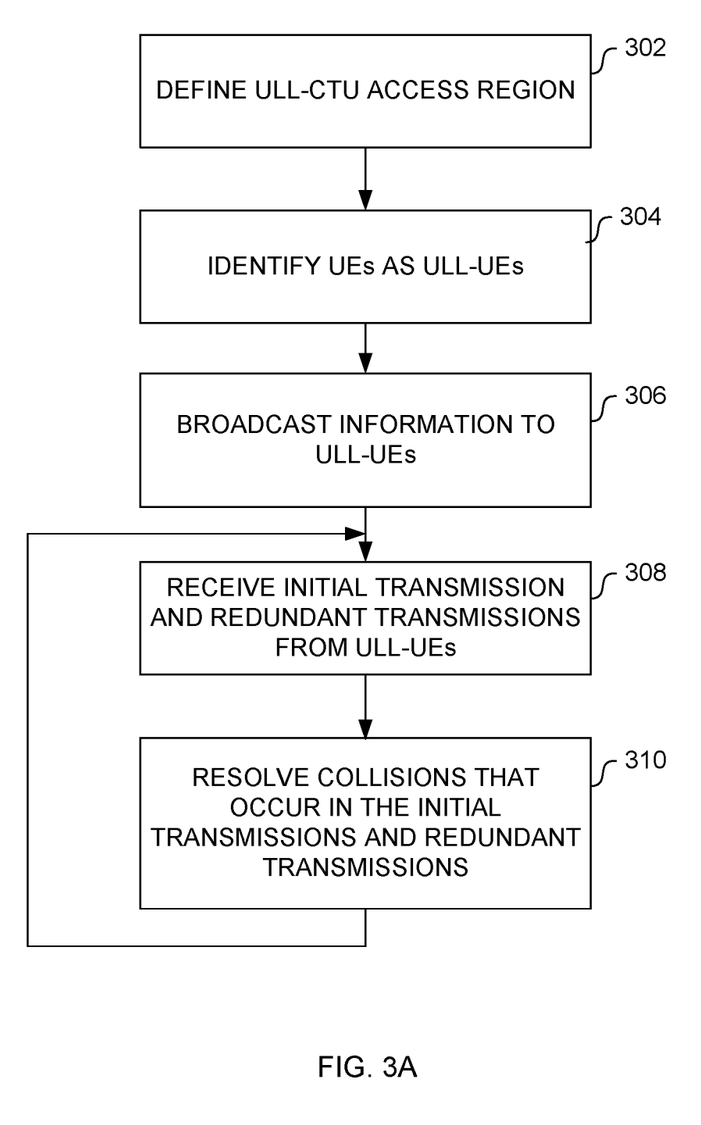
FIG. 3A is a flow chart of base station (BS) activity in implementing an example reliable ultra-low latency (RULL) transmission scheme according to an embodiment.

Referring now to FIG. 3A, a flow chart illustrating a method for implementing a RULL transmission mechanism in a grant-free uplink transmission scheme by a BS 102 is shown. The method may be carried out by software executed, for example, by a processor of the BS 102. Coding of software for carrying out such a method is within the scope of a person of ordinary skill in the art given the present disclosure. The method may contain additional or fewer processes than shown and/or described, and may be performed in a different order. Computer-readable code executable by at least one processor of the BS 102 to perform the method may be stored in a computer-readable medium, such as a non-transitory computer-readable medium. In some embodiments, the processor of the BS 102 that performs at least a portion of the method may be, for example, a remotely located controller in communication with the BS 102. For example, in some embodiments a remotely located controller may implement the mapping scheme, while a processor located at the BS 102 may signal the mapping scheme, and other information, to the UEs.

At 302, a BS 102 defines one or more reliable ultra-low latency CTU (RULL-CTU) access regions. Defining the RULL-CTU access region includes mapping, by the BS 102, various RULL-CTU to the RULL-CTU access region utilizing a CTU mapping scheme. Mapping may include assigning a unique RULL-CTU index to each RULL-CTU in the RULL-CTU access region. Each RULL-CTU index corresponds to a RULL-CTU that a RULL-UE may perform transmissions on according to the RULL transmission mechanism.

In some embodiments, all initial transmissions and redundant transmission by RULL-UEs are sent in the RULL-CTU access regions. In other embodiments, some of the initial transmissions and redundant transmission may be sent in a regular CTU access regions, while other initial transmissions and redundant transmissions are sent in the RULL-CTU access regions. In an example, described in more detail below with reference to FIG. 8, all initial transmissions by RULL-UEs are sent in a RULL-CTU access region, and all redundant transmissions are sent in a regular CTU access region.

At 304, the BS 102 identifies a portion of the UEs 104-118 within the coverage area 120 as RULL-UEs. Identifying a UE as an RULL-UE may utilize, for example, high-level signaling between the BS 102 and the UEs 104-118. The determination of a RULL-UE may be based on the services operating on the RULL-UE such as, for example, a remote-health application or a smart grid application. Identification may occur, for example, when a UE 104-118 enters the coverage region 120 and connection setup signaling between the BS 102 and the UEs 104-118 is sent. Connection setup signaling may also occur when new services are available at a UE 104-118 within the coverage area 120 such as, for example, by installation of new software having a low-latency high reliability transmission requirements.

The BS 102 may adjust the size of the RULL-CTU access region based on the number of RULL-UE within the coverage area 120 determined through connection setup signaling. For example, if a large number of RULL-UEs are identified, the BS 102 may allocate a larger portion of the available bandwidth to the RULL-CTU access regions. Identifying at 304 may include determining a number of redundant transmissions of the RULL-UEs. The number of redundant transmission may be based on the reliability mode. Identifying may also include applying a selective redundancy scheme. As described in more detail below, the reliability mode and the selective redundancy modes may determine how many and on which subsequent TTIs redundancy transmissions are sent.

At 306, the BS 102 may use high-level signaling, for example, through a broadcast channel, to send information to the RULL-UEs regarding the RULL-CTU indexing within the CTU access region to enable RULL transmissions from RULL-UEs via the RULL transmission mechanism. Other channels such as, for example multicast or unicast channels, can be utilized as well. This high-level signaling may include, for example, information on the defined RULL-CTU access regions, number of RULL-CTUs in the access regions and/or RULL-CTU index map. The high-level signaling may also include assigned RULL-UE DCS index information, and the like. The RULL-UEs determine which of the RULL-CTUs of the RULL-CTU access region to map to according to RULL mapping rules. Mapping rules may be defined in a default RULL mapping scheme. The default RULL mapping scheme may be determined by the BS 102 and sent to the RULL-UEs through high-level signaling, or may be determined by a standard.

The default RULL mapping scheme includes rules for mapping the RULL-UEs to the RULL-CTUs in an initial pattern for initial transmissions, and mapping the RULL-UEs to the RULL-CTUs in a regrouped pattern for each of the redundant transmissions. By utilizing a default mapping scheme, the initial pattern and the regrouped pattern are implicitly known at the BS 102. The mapping rules may be based on, for example, RULL-UEs identification such as the RULL-UEs DCS or the RULL-UEs DCS index assigned by a BS 102, the total number of RULL-CTUs, the time-frequency resource ID, and/or other parameters such as subframe number.

At 308, the BS 102 receives the initial transmissions from the RULL-UEs in a first TTI and receives the redundant transmissions from the RULL-UEs in subsequent TTIs. In some embodiments, the RULL-UE may determine multiple RULL-CTUs for sending multiple redundant transmissions on in respective multiple subsequent TTIs. The number of redundant message sent by a RULL-UE may be determined by, for example, a reliability transmission mode and/or a selective redundancy scheme of the RULL-UE.

At 310, the BS 102 attempts to resolve collisions that occur in either of the initial transmissions and the redundant transmissions. Transmitting initial and redundant transmissions increases the likelihood that one of the transmissions will be decodable at the BS 102. As discussed in more detail below, a decoded signal from one of the transmissions may be utilized to resolve a collision that includes the decoded signal during other transmissions. Resolving the collision may include for example, subtracting the signal, decoded from other transmissions, from the collision signal to resolve the transmission from the other RULL-UE involved in the collision.

Figure 3B:
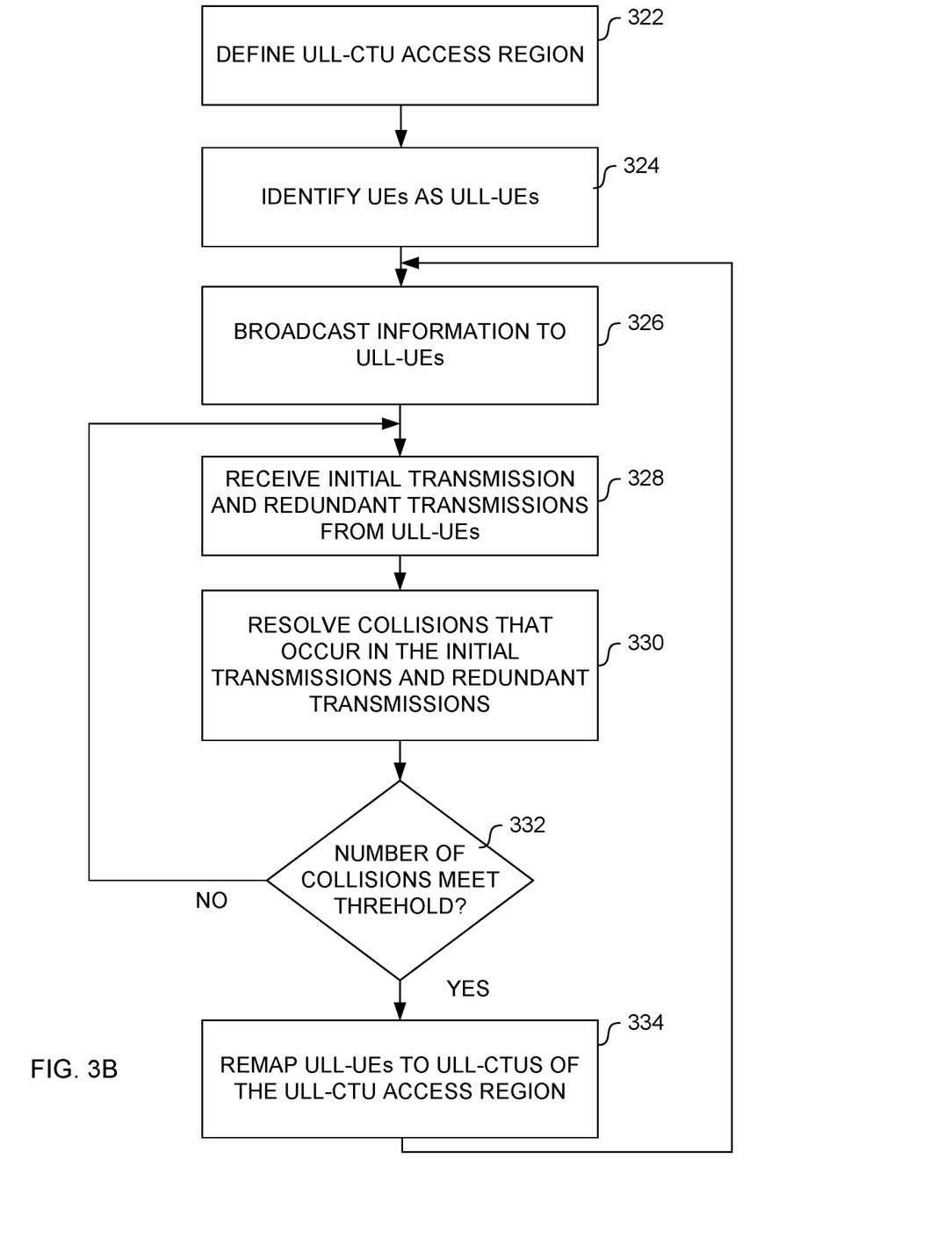
FIG. 3B is a flow chart of BS activity in implementing an example RULL transmission scheme according to another embodiment.

Referring now to FIG. 3B, a flow chart illustrating an alternative method for implementing a RULL transmission mechanism in a grant-free uplink transmission scheme by a BS 102 is shown. The method may be carried out by software executed, for example, by a processor of the BS 102. Coding of software for carrying out such a method is within the scope of a person of ordinary skill in the art given the present disclosure. The method may contain additional or fewer processes than shown and/or described, and may be performed in a different order. Computer-readable code executable by at least one processor of the BS 102 to perform the method may be stored in a computer-readable medium, such as a non-transitory computer-readable medium. In some embodiments, the processor of the BS 102 may be, for example, a remotely located controller in communication with the BS 102. For example, in some embodiments a remotely located controller may implement the mapping scheme, while a processor located at the BS 102 may signal the mapping scheme, and other information, to the UEs.

Steps 322-330 of the method of FIG. 3B are substantially similar to steps 302-310 described above with reference to FIG. 3A and are not further described to avoid repetition.

At 332, a determination whether the number of collisions meets a threshold is made. The number of collisions may be, for example, the total number of collisions occurring during the initial and redundant transmissions or may be the number of collisions occurring during the initial transmissions only. The threshold may be set by the BS 102, the network 100, or by a standard. The threshold may be, for example, that collisions occurs in less than 1% of the transmissions.

If the number of collisions does not meet the threshold, the method returns to step 328. If the number of collisions meets the threshold, the BS 102 uses the number of collisions and the overall conditions, such as for example the distribution of active RULL-UEs in the RULL-CTUs, to make decision on remapping the RULL-UEs to other RULL-CTU indexes in the same or a different CTU access region 324. The BS 102 then returns to step 326 to send the remapped RULL-CTU information via high-level signaling (e.g., broadcast, multicast, or unicast) to the RULL-UEs in the coverage area 120.

Figure 4:
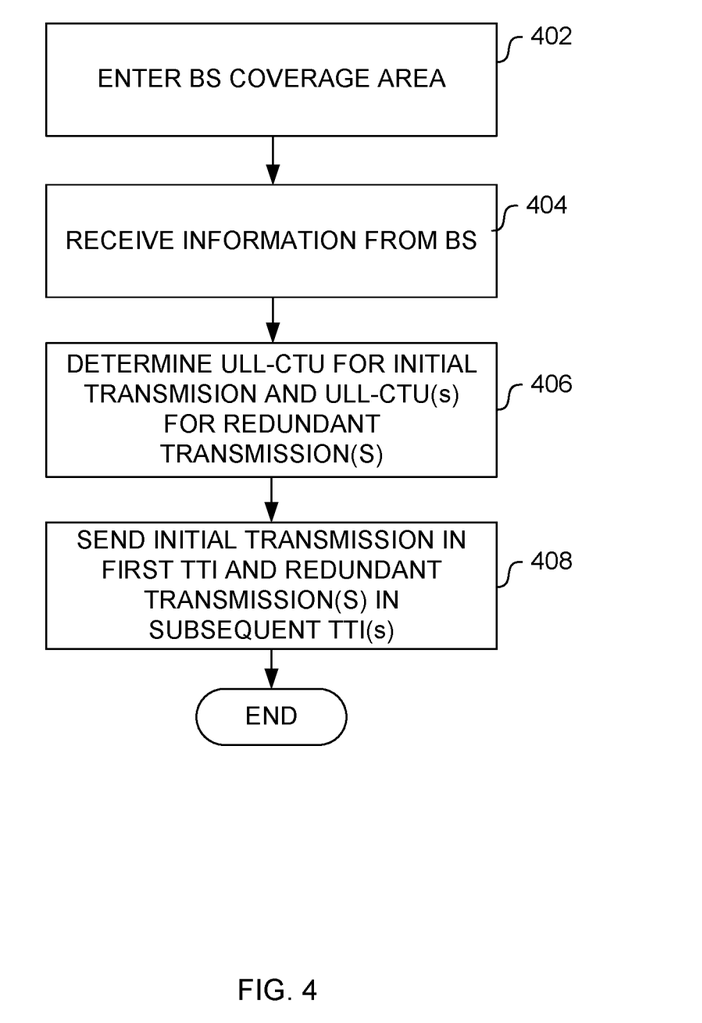
FIG. 4 is a flow chart of an example reliable ultra-low latency user equipment (RULL-UE) activity in implementing an RULL transmission mechanism according to an embodiment.

Referring to FIG. 4, a flow chart illustrating RULL-UE activity according to various embodiments is shown. The method may be carried out by software executed, for example, by a processor of a RULL-UE. Coding of software for carrying out such a method is within the scope of a person of ordinary skill in the art given the present disclosure. The method may contain additional or fewer processes than shown and/or described, and may be performed in a different order. Computer-readable code executable by at least one processor of the RUL-UE to perform the method may be stored in a computer-readable medium, such as a non-transitory computer-readable medium.

At 402, a RULL-UE enters a BS's 102 coverage area 120. In step 404, the RULL-UE receives high-level signaling information from the BS 102. This high level signaling information may include RULL-CTU access region definitions, total number of RULL-CTUs, and the like. The high-level signaling at 402 may also include the default RULL mapping rules. Alternatively, the RULL-UE may be preconfigured with default RULL mapping rules.

At 406, the RULL-UE determines an appropriate first RULL-CTU to conduct an initial transmission on in a first TTI, and an appropriate second RULL-CTU to conduct a redundant transmission on in a second TTI subsequent to the first TTI. The RULL-UE may determine the appropriate first and second RULL-CTU indexes using the default RULL mapping rules.

In some embodiments, the RULL-UE may determine multiple RULL-CTUs for sending multiple redundant transmissions on in respective multiple subsequent TTIs. The number of redundant message sent may be determined by, for example, a reliability transmission mode of the RULL-UE.

At 408, the RULL-UE sends the initial transmission on the first RULL-CTU in the first TTI, and sends the redundant transmission on the second RULL-CTU in the second TTI. As discussed above, in some embodiments, the RULL-UE may send multiple redundant transmissions in respective multiple subsequent TTIs. In some embodiments, the RULL-UE may send the redundant transmission in a time pattern of TTIs, rather than the TTIs that immediately follow the TTI in which the initial transmission was made. Subsequent TTIs during which the RULL-UE sends a redundant transmission may be determined by, for example, a selective redundancy scheme, as discussed in more detail below.

Figure 5:
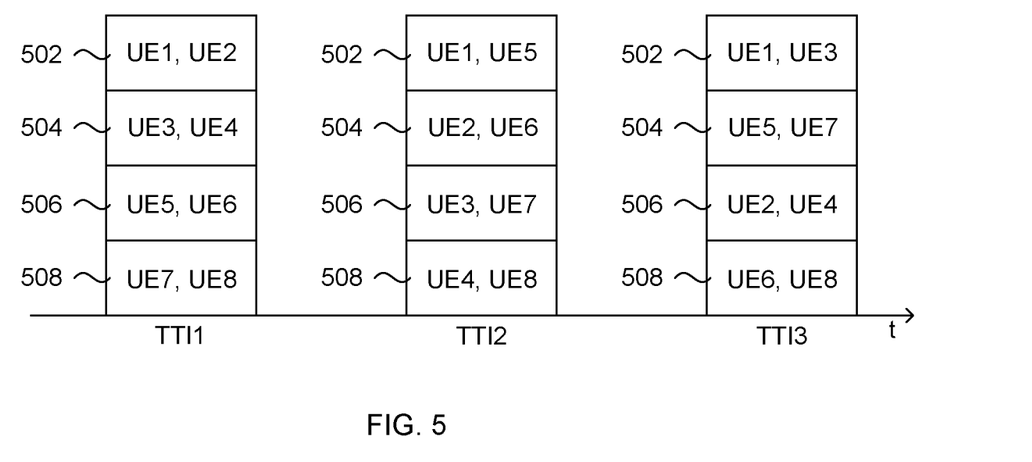
FIG. 5 is a schematic diagram of an example of mapping and regrouping RULL-UEs to reliable ultra-low latency CTUs (RULL-CTUs) in an RULL transmission mechanism according to an embodiment.

Referring now to FIG. 5, an example illustrating default RULL mapping scheme in an RULL transmission mechanism in a grant-free uplink transmission scheme is shown. In the example, a group of eight RULL-UEs, UE1 to UE8, are identified as reliable ultra-low latency UEs. The RULL-UEs are mapped to four RULL-CTUs, 502-508 according to the default RULL mapping scheme that sets out the mapping rules for initial transmission and redundant transmissions. In the example shown in FIG. 5, the RULL-UEs are configured to transmit two redundant transmissions, in TTI2 and TTI3, after transmitting an initial transmission in TTI1.

In the example shown in FIG. 5, during TTI1 the RULL-UEs are mapped in an initial pattern in which UE1 and UE2 are mapped to RULL-CTU 502, UE3 and UE4 are mapped to RULL-CTU 504, UE 5 and UE 6 are mapped to RULL-CTU 506, and UE7 and UE8 are mapped to RULL-CTU 508. After the initial transmission during TTI1, the RULL-UEs are regrouped for into a first regrouped pattern in which UE1 and UE5 are mapped to RULL-CTU 502, UE2 and UE6 are mapped to RULL-CTU 504, UE3 and UE7 are mapped to RULL-CTU 306, and UE4 and UE8 are mapped to RULL-CTU 308. After the first redundant transmission during TTI2, the RULL-UEs are regrouped into a second regrouped pattern in which UE1 and UE3 are mapped to RULL-CTU 502, UE5 and UE7 are mapped to RULL-CTU 504, UE2 and UE4 are mapped to RULL-CTU 306, and UE6 and UE8 are mapped to RULL-CTU 508.

In some embodiments, all RULL-UEs are included in the regrouped pattern regardless of whether a particular RULL-UE has transmitted during TTI1 or not. By regrouping all RULL-UEs, an even distribution of the RULL-UEs may be maintained. RULL-UEs mapped to during subsequent TTIs after a transmission is inhibited. In other embodiments, only RULL-UEs are regrouped after an initial transmission. However, in these embodiments, transmitting RULL-UEs may be regrouped to CTUs in which non-transmitting RULL-UEs are mapped to, which may lead to an uneven and unpredictable distribution of RULL-UEs.

For clarity, only one group of RULL-UEs, UE1 to UE8, is shown in FIG. 5. However, in some embodiments, a RULL transmission mechanism may include more than one group of RULL-UEs such that RULL-UEs from the other groups may be mapped to RULL-CTUs 502-508, such that the mappings of the other groups overlap with mappings of the group of RULL-UEs, UE1 to UE8, shown in FIG. 5. For example, at least some of the RULL-UEs of a second group may be mapped to the RULL-CTUs 502-508 shown in FIG. 5 for an initial transmission in TTI2. In this example, at least some of the RULL-CTUs mapped to the second group of RULL-UEs for the initial transmissions overlap with the RULL-CTUs 502-508 mapped to the first group of RULL-UEs, UE1 to UE8, for redundant transmissions.

Figure 6:
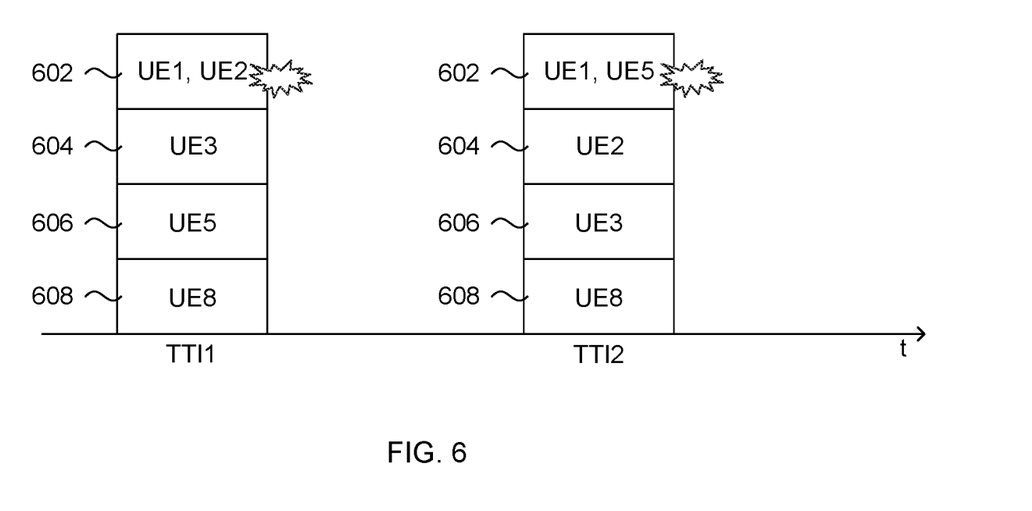
FIG. 6 is a schematic diagram of an example of resolving collisions utilizing the RULL transmission mechanism according to an embodiment.

Referring now to FIG. 6, an example illustrating how collisions may be resolved utilizing the RULL transmission mechanism is described. In this example, five RULL-UEs, UE1, UE2, UE3, UE5, and UE8, transmit an initial transmission in TTI1. The mapping rules followed by the RULL-UEs in FIG. 6 follow the same rules as the example shown in FIG. 5. However, for clarity only one redundant transmission is shown after the initial transmission in the example shown in FIG. 6.

In the initial transmission during TTI1, the signal received on RULL-CTU 602 cannot be decodable by the BS, indicated by the starburst, due to the collision of the transmissions of UE1 and UE2. Although the BS 102 cannot decode the transmission on RULL-CTU 602 during TTI1, the BS 102 may implicitly know that the collision results from transmissions from UE1 and UE2 because the default RULL mapping rules set out that these are the two RULL-UEs mapped to RULL-CTU 602 during TTI1. The initial transmissions from UE3, UE5, and UE8 do not collide with other transmissions and are decoded by the BS 102.

After the initial transmissions at TTI1, the RULL-UEs are regrouped into a regrouped pattern and a redundant transmission is sent by all of the RULL-UEs. During TTI2, the redundant transmission from UE2 on RULL-CTU 604 does not collide and is decoded by the BS 102. The redundant transmissions from UE1 and UE5, received on RULL-CTU 602, collide in TTI2, as indicated by the starburst. Thus, the transmission from UE1 cannot be decoded directly based on either of the initial transmission or the redundant transmission.

However, the BS 102 may implicitly determine that the signal detected on RULL-CTU 602 in TTI2 is the combination of transmission from UE1 and UE5 because the default RULL mapping scheme sets out that these are the two RULL-UEs having redundant transmissions on RULL-CTU 602 at TTI2.

Thus, because the BS 102 has determined implicitly that collided signals are a combination of UE1 and UE2 in TTI1 and UE1 and UE5 in TTI2, and because the transmission of UE5 was decoded in TTI1 and the transmission from UE2 was decoded in TTI2, the transmission from UE1 may be recovered. For example, UE1's transmission may be recovered from the signal received on RULL-CTU 602 in TTI2 by subtracting the transmission from UE5 that was received on RULL-CTU 606 during TTI1. Alternatively, UE1's transmission may be recovered from the signal received on RULL-CTU 602 in TTI1 by subtracting the transmission from UE2, received on RULL-CTU 604 during TTI2.

Figure 7:
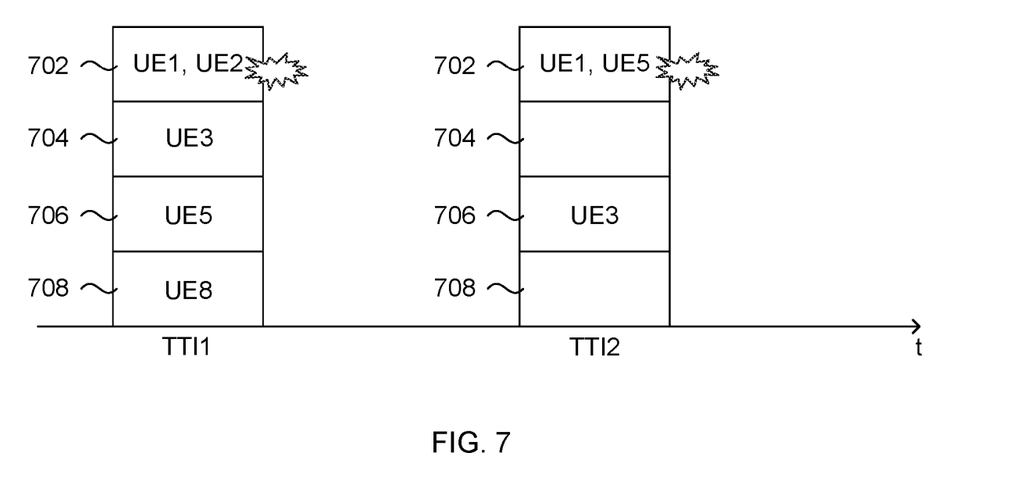
FIG. 7 is a schematic diagram of an example RULL transmission mechanism utilizing selective redundancy transmission scheme according to an embodiment.

In some embodiments, the joint detection and decoding of initial and redundant transmissions, such as illustrated in the examples shown in FIGS. 6 and 7, is performed by an MPA receiver.

The number of regrouping and redundant transmissions that are sent by a RULL-UE may be determined based on the latency and reliability requirements of the RULL-UE. For example, the RULL transmission mechanism may include a number of reliability transmission modes to enable different RULL traffic types having different latency and reliability requirements. Reliability transmission modes are defined by physical layer transmission parameters, such as, for example, the number of redundant transmissions that are sent, and any selective redundancy scheme utilized, which are described in more detail below.

As an example, teleprotection in a smart grid has a longer latency and higher reliability requirement, for example 8 ms latency and 99.999× reliability, than remote automation and control transmission, which has a shorter latency and lower reliability requirement, for example 2-3 ms latency and 99.9% reliability. Thus, teleprotection in a smart grid may utilize different reliability transmission modes than remote automation and control transmission. For example, teleprotection in a smart grid may utilize a reliability transmission mode having a greater number of redundant transmissions, for example 4-8 redundant transmissions, than the reliability transmission mode utilized by remote automation and control, which transmit, for example, 2-3 redundant transmissions.

In addition to the number of redundancy transmissions sent by the RULL-UEs, in some embodiments the RULL-UEs may be configured to transmit redundant transmissions in a particular pattern of TTIs following the initial transmission, rather than in the TTIs immediately following an initial transmission. Which TTIs a RULL-UE will transmit redundant transmissions may be defined in a selective redundancy transmission scheme. The selective redundancy transmission scheme may be one of, for example, an UE selectively redundancy transition scheme, a CTU selective redundancy transmission scheme, or a time selective redundancy transmission scheme.

In an UE selective redundancy transmission scheme, one portion of the RULL-UEs send redundant transmissions in a particular TTI, while the remaining portion does not. Whether or not RULL-UEs send redundant transmissions may be defined implicitly by rules based on, for example, the RULL-UE DCS and TTI number. For example, the UE selective redundancy transmission scheme may be such that RULL-UEs having an even-numbered DSC will transmit a redundant transmission only during even-numbered TTIs following the initial transmission.

In a CTU selective redundancy scheme, the determination of which RULL-UEs will transmit a redundant transmission during a particular TTI is based on the RULL-CTUs that the UEs are transmitting on. The CTU selective redundancy scheme may be based on, for example, the RULL-CTU indexes. For example, all RULL-UEs mapped to a RULL-CTU having an even-numbered RULL-CTU index will transmit redundant transmissions while all RULL-UEs mapped to an odd-numbered RULL-CTU index will not transmit redundancy transmissions.

In a time selective redundancy scheme, the RULL-UEs are configured to transmit redundant transmissions according to a predetermined TTI pattern such as, for example, every TTI, or every other TTI, following an initial transmission. The time selective redundancy scheme may be utilized together with either the UE selective redundancy transmission scheme or the CTU selective redundancy transmission scheme. For example, when the time selective and UE selective redundancy schemes are utilized together, the predetermined TTI pattern of the time selective redundancy scheme may be applied to a particular RULL-UE determined under the UE selective redundancy scheme. In another example, when the time selective and CTU selective redundancy schemes are utilized together, the predetermined TTI pattern of the time selective redundancy scheme may be applied to a RULL-UEs mapped to a particular CTU as determined under the CTU selective redundancy scheme.

The selective redundancy transmission scheme utilized may be based on the latency and reliability requirements. For example, RULL-UEs with lower latency and higher reliability requirements may be configured to utilize selective redundancy transmission schemes with a greater number of redundant transmissions over a period of fewer TTIs than RULL-UEs having higher latency and lower reliability requirements.

Referring to FIG. 7, examples of implementing selective redundancy transmission schemes are described.

Similar to the example shown in FIG. 5, five RULL-UEs, UE1, UE2, UE3, UE5, and UE8, are transmitting data utilizing the RULL transmission scheme. The RULL-UEs are mapped into initial patterns and regrouped patterns similar to those of the examples shown in FIGS. 5 and 6. However, in the example shown in FIG. 7, only UE1, UE3, and UE5 transmit redundant transmissions during TTI2 according to a selective redundancy transmission scheme.

In an embodiment, the selective redundancy transmission scheme utilized in the example shown in FIG. 7 is a UE selective redundancy scheme in which the RULL-UEs having, for example, an odd-numbered RULL-UE ID, i.e., UE1, UE3, and UE5, transmit a redundancy transmission in TTI2, while the RULL-UEs even-numbered UE ID, i.e., UE2 and UE8, do not transmit a redundancy transmission in TTI2.

In another embodiment, the selective redundancy transmission scheme utilized in the example shown in FIG. 7 is a CTU selective redundancy transmission scheme in which the RULL-UEs mapped to RULL-CTUs 702 and 706 in TTI2 transmit redundant transmissions, and RULL-UEs mapped to RULL-CTUs 704 and 708 in TTI2 do not transmit redundant transmissions. Thus, UE1 and UE5, mapped to CTU 702, and UE3, mapped to CTU 706, transmit redundant transmissions in TTI2. UE2, mapped to CTU 704, and UE8, mapped to CTU 708, do not transmit redundant transmissions.

To recover the collided transmissions at RULL-CTU 702 in TTI1 and TTI2 in the example shown in FIG. 7, the transmission from UE1 is recovered by subtracting the transmission from UE5 decoded from CTU 706 in TTI1 from the collided transmission received at RULL-CTU 702 in TTI2. The recovered transmission from UE1 may then be utilized to recover the transmission from UE2 by subtracting the UE1 transmission from the collided transmission received on CTU 702 in TTI1.

Figure 8:
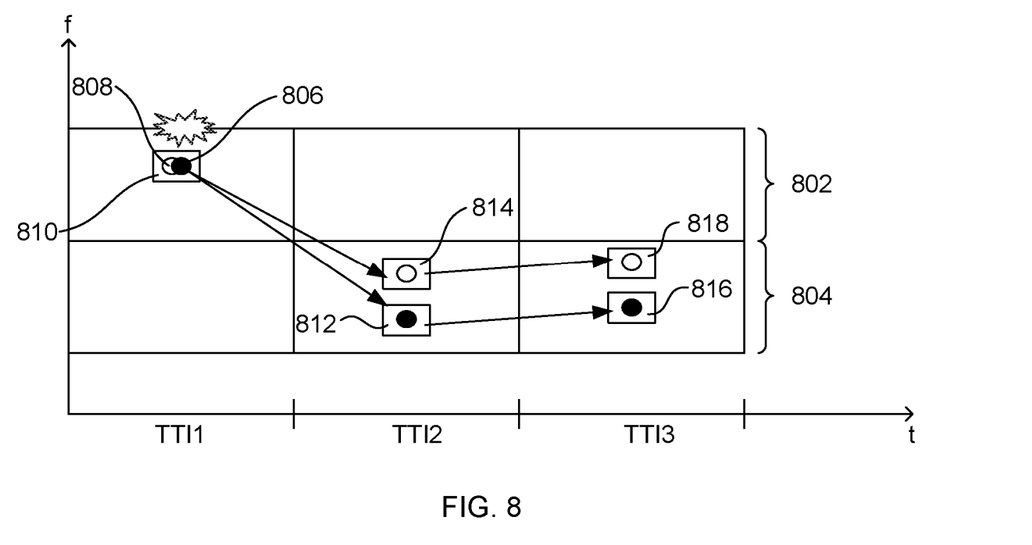
FIG. 8 is a schematic diagram of an example RULL transmission mechanism utilizing a RULL-CTU access region dedicated for initial transmissions according to an embodiment.

Referring now to FIG. 8, in some embodiments, implementing the RULL transmission mechanism may include dedicating a RULL-CTU access region 802 to initial transmissions of the RULL transmission mechanism, and utilizing a regular CTU access region 804 for redundant transmissions from RULL-UEs.

Utilizing a RULL-CTU access region 802 dedicated for initial transmissions avoids mixing initial transmissions and redundant transmissions within the same RULL-CTU region, which increases the complexity in keeping track of transmissions. When a collision occurs in a RULL-CTU of the RULL-CTU access region 802, the BS 102 knows that the transmission involved in the collision are initial transmissions and can determine which RULL-UEs were potentially involved utilize the default RULL-mapping rules, without having to determine if any RULL-CTUs are mapped to that same CTU for redundant transmissions. Further, knowing that a collision involves initial transmissions enables the BS 102 to anticipate the CTUs of the regular CTU access region 804 that redundant transmissions are expected on in subsequent TTIs.

In the example shown in FIG. 8, two RULL-UEs, represented by the black circle 806 and the white circle 808, are mapped to a RULL-CTU 810 in the RULL-CTU access region 802. At TTI1, both RULL-UEs 806 and 808 transmit an initial transmission on RULL-CTU 810, resulting in a collision at RULL-CTU 810, indicated by the starburst.

Based on the default mapping scheme, the BS 102 may implicitly determine that the potential RULL-UEs of the transmission, i.e., the RULL-UEs mapped to RULL-CTU 810 for an initial transmission, include RULL-UEs 806 and 808. Based on the implicit knowledge, the BS 102 can anticipate that potential redundancy transmissions in TTI2 will be received on CTU 812 and CTU 814, and in TTI3 on CTU 816 and CTU 818.

Further, having an RULL-CTU access region 802 dedicated for initial transmissions makes resolving collisions easier at the BS 102 by avoiding the BS 102 having to consider a redundant transmission from one RULL-UE colliding with an initial transmission from another RULL-UE. In a grant-free uplink transmission scheme having high levels of RULL traffic, determining which transmissions are initial transmissions and which are redundant transmissions can be computationally intensive. By defining a RULL-CTU access region 802 dedicated to initial transmissions, the BS 102 can easily determine that any transmissions received in the RULL-CTU access region 802 are initial transmissions.

Within the regular CTU access region 804, the BS 102 may distinguish the RULL grant-free uplink transmission traffic from the regular grant-free uplink transmission traffic implicitly, utilizing the default mapping rules, or explicitly, based on headers of the received transmissions.

Figure 9:
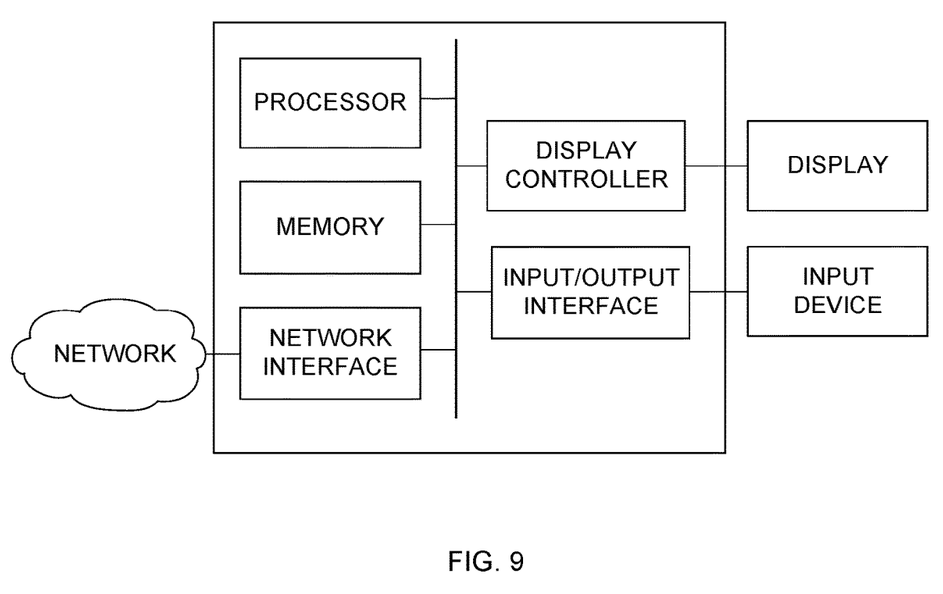
FIG. 9 is a block diagram of an example processing unit that may be utilized for implementing the devices and methods in accordance with various embodiments described herein.

FIG. 9 is a block diagram of a processing system that may be used for implementing the devices and methods disclosed herein. Specific devices may utilize all of the components shown, or only a subset of the components and levels of integration may vary from device to device. Furthermore, a device may contain multiple instances of a component, such as multiple processors, memories, transmitters, receivers, etc. The processing system may comprise a processor operationally coupled to one or more input/output devices, such as a speaker, microphone, mouse, touchscreen, keypad, keyboard, printer, display, and the like. The processing unit may include a processor, memory, display controller, and an input/output interface connected to a bus.

The bus may be one or more of any type of several bus architectures including a memory bus or memory controller, a peripheral bus, video bus, or the like. The processor may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs. The memory may also include a storage device configured to store data, programs, and other information and to make the data, programs, and other information accessible via the bus. The storage device may comprise, for example, one or more of a solid state drive, hard disk drive, a magnetic disk drive, an optical disk drive, or the like.

The display controller and the input/output interface provide interfaces to couple external input and output devices to the processing unit. Examples of input and output devices include a display coupled to the display controller, and a mouse, keyboard, or printer coupled to the input/output. Other devices may be coupled to the processing unit, and additional or fewer interface cards may be utilized.

The processing unit also includes one or more network interfaces, which may comprise wired links, such as an Ethernet cable, and/or wireless links to access nodes or different networks. The network interface allows the processing unit to communicate with remote units via the network. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

In an example 1, there is provided a method comprising: implementing, by a base station (BS), a reliable ultra-low latency (RULL) transmission mechanism in a grant-free uplink transmission scheme, the grant-free uplink transmission scheme having defined therein contention transmission unit (CTU) access regions and a plurality of CTUs; wherein implementing the reliable ultra-low latency transmission mechanism comprises: defining a reliable ultra-low latency user equipment (RULL-UE) mapping scheme by mapping a plurality of RULL-UEs to the plurality of CTUs in an initial pattern for initial transmissions in a first transmission time interval (TTI), and mapping the plurality of RULL-UEs to the plurality of CTUs in a regrouped pattern for redundant transmissions in a second TTI subsequent to the first TTI, wherein the initial pattern is different from the regrouped pattern.

In an example 2, there is provided a method according to example 1, wherein implementing the RULL transmission mechanism comprises: defining a reliable ultra-low latency CTU (RULL-CTU) access region from a portion of the CTU access regions of the grant-free transmission scheme; and defining an RULL-CTU mapping scheme by mapping at least a portion of the plurality of CTUs to the RULL-CTU access region to define a plurality of RULL-CTUs.

In an example 3, there is provided a method according to example 2, wherein defining the RULL-UE mapping scheme includes mapping the plurality of the RULL-UEs to the plurality of RULL-CTUs in the initial pattern and the regrouped pattern.

In an example 4, there is provided a method according to example 2, wherein defining the RULL-UE mapping scheme includes mapping the plurality of the RULL-UEs to the plurality of RULL-CTUs in the initial pattern and mapping the plurality of RULL-UEs to the plurality of CTUs in the regrouped pattern.

In an example 5, there is provided a method according to example 1, wherein implementing the RULL transmission mechanism further comprises: receiving, by the BS, the initial transmissions in the first TTI and the redundant transmissions in the second TTI, wherein the BS does not transmit acknowledge or negative acknowledgement (ACK/NACK) feedback between receiving the initial and redundant transmissions; resolving collisions utilizing the initial transmissions, the redundant transmissions, and the mapping scheme.

In an example 6, there is provided a method according to example 5, wherein implementing the RULL transmission mechanism further comprises: defining a remapping scheme by mapping a plurality of RULL-UEs to the plurality of CTUs in a second initial pattern for initial transmissions in the first TTI, and a second regrouped pattern for redundant transmissions in the second TTI subsequent to the first TTI when the BS determines the number of collisions in at least one of the initial transmissions and redundant transmissions meets a threshold, wherein the second initial pattern is different than the first initial pattern, and the second regrouped pattern is different than the first regrouped pattern and the second initial pattern; and sending information related to the remapping scheme to the RULL-UEs using high-level signaling.

In an example 7, there is provided a method according to example 5, wherein the initial transmissions and the redundant transmissions are based on a sparse code multiple access (SCMA) scheme.

In an example 8, there is provided a method according to example 7, further comprising joint detecting and decoding of the initial transmission and the redundant transmission utilizing a message parsing algorithm (MPA).

In an example 9, there is provided a method according to example 1, wherein implementing the RULL transmission mechanism further comprises defining a first portion of the plurality of RULL-UEs that transmit redundant transmissions in the second TTI, and a remaining portion of the plurality of RULL-UEs do not transmit redundant transmissions in the second TTI.

In an example 10, there is provided a method according to example 9, wherein the first portion of the plurality of RULL-UEs is defined based on RULL-UE identifications of the plurality of RULL-UEs.

In an example 11, there is provided a method according to example 9, wherein the first portion of the plurality of RULL-UEs is defined based on the CTUs that the first portion is mapped to in the regrouped pattern.

In an example 12, there is provided a method according to example 9, wherein the first portion of the plurality of RULL-UEs is defined based on the TTI that the redundant transmission is transmitted in.

In an example 13, there is provided a method according to example 1, wherein defining the RULL-UE mapping scheme includes mapping the plurality of RULL-UEs to the CTUs in a plurality of unique regrouped patterns, each unique regrouped pattern for a respective one of a plurality of redundant transmissions, each redundant transmission in a respective one of a plurality of TTIs subsequent to the first TTI.

In an example 14, there is provided a method according to example 13, wherein the number of the plurality of redundant transmissions is determined based on one or both of a latency requirement and a reliability requirement of the plurality of RULL-UEs.

In an example 15, there is provided a method according to example 1, wherein the plurality of CTUs are frequency resources.

In an example 16, there is provided a method according to example 1, wherein the plurality of CTUs are time resources.

In an example 17, there is provided a method according to example 1, wherein defining a RULL-UE mapping scheme comprises mapping a second plurality of RULL-UEs to the plurality of CTUs in a second initial pattern for initial transmissions in second TTI, and mapping the second plurality of RULL-UEs to the plurality of CTUs a second regrouped pattern for redundant transmissions in a third TTI subsequent to the second TTI, the CTUs mapped to the second plurality of RULL-UEs in the second initial pattern at least partially overlaps the CTUs mapped to the first plurality of RULL-UEs in the regrouped pattern.

In an example 18, there is provided a base station (BS) comprising: a hardware processor; and a computer readable storage medium having stored thereon computer readable code for execution by the processor to: implement a reliable ultra-low latency (RULL) transmission mechanism in a grant-free uplink transmission scheme, the grant-free uplink transmission scheme having defined therein contention transmission unit (CTU) access regions and a plurality of CTUs, wherein implementing the RULL transmission mechanism comprises: defining a reliable ultra-low latency user equipment (RULL-UE) mapping scheme by mapping a plurality of RULL-UEs to the plurality of CTUs in an initial pattern for initial transmissions in a first transmission time interval (TTI), and mapping the plurality of RULL-UEs to the plurality of CTUs in a regrouped pattern for redundant transmissions in a second TTI subsequent to the first TTI, wherein the initial pattern is different from the regrouped pattern.

In an example 19, there is provided a BS according to example 18, wherein implementing the RULL transmission mechanism further comprises: defining a reliable ultra-low latency CTU (RULL-CTU) access region from a portion of the CTU access regions of the grant-free transmission scheme; and defining an RULL-CTU mapping scheme by mapping at least a portion of the plurality of CTUs to the RULL-CTU access region to define a plurality of RULL-CTUs.

In an example 20, there is provided a BS according to example 19, wherein defining the RULL-UE mapping scheme includes mapping the plurality of the RULL-UEs to the plurality of RULL-CTUs in the initial pattern and the regrouped pattern.

In an example 21, there is provided a BS according to example 19, wherein defining the RULL-UE mapping scheme includes mapping the plurality of the RULL-UEs to the plurality of RULL-CTUS in the initial pattern and mapping the plurality of RULL-UEs to the plurality of CTUs in the regrouped pattern.

In an example 22, there is provided a BS according to example 18, wherein implementing the RULL transmission mechanism further comprises: receiving, by the BS, the initial transmissions in the first TTI and the redundant transmissions in the second TTI; resolving collisions utilizing the initial transmissions, the redundant transmissions, and the mapping scheme.

In an example 23, there is provided a BS according to example 18, wherein implementing the RULL transmission mechanism further comprises defining a first portion of the plurality of RULL-UEs that transmit redundant transmissions in the second TTI, and a remaining portion of the plurality of RULL-UEs do not transmit redundant transmissions in the second TTI.

In an example 24, there is provided a BS according to example 18, wherein defining the RULL-UE mapping scheme includes mapping the plurality of RULL-UEs to the CTUs in a plurality of unique regrouped patterns, each unique regrouped pattern for a respective one of a plurality of redundant transmissions, each redundant transmission in a respective one of a plurality of TTIs subsequent to the first TTI.

In an example 25, there is provided a method comprising: implementing, by a reliable ultra-low latency user equipment (RULL-UE), a reliable ultra-low latency (RULL) mechanism in a default reliable ultra-low latency contention transmission unit (RULL-CTU) mapping scheme by: determining a first contention transmission unit (CTU) for an initial transmission in a first transmission time interval (TTI) in accordance with an initial RULL-UE mapping rule and the default RULL-CTU mapping scheme; transmitting, to a base station (BS), the initial transmission on the first CTU during the first TTI; determining a second CTU for a redundant transmission in a second TTI subsequent to the first TTI in accordance with a redundant RULL-UE mapping rule and the default RULL-CTU mapping scheme; transmitting, to the BS, the redundant transmission on the second CTU during the second TTI without receiving, at the RULL-UE, acknowledgement/negative acknowledgement (ACK/NACK) feedback from the BS.

In an example 26, there is provided a method according to example 25, wherein determining a second CTU includes determining a plurality of redundant CTUs, each of the redundant CTUs for one of a plurality of redundant transmissions, each redundant transmission in one of a plurality of TTIs subsequent to the first TTI; and wherein transmitting the redundant transmission on the second CTU includes transmitting each of the redundant transmissions on a respective one of the plurality of CTUs during a respective one of the plurality of TTIs.

In an example 27, there is provided a method according to example 26, wherein transmitting the redundant transmission on the second CTU comprises automatically transmitting a first portion of the plurality of redundant transmissions, and not transmitting a remaining portion of the redundant transmissions.

In an example 28, there is provided a method according to example 27, wherein the first portion is determined based on the respective CTU that each of the plurality of redundant transmissions transmits on.

In an example 29, there is provided a method according to example 27, wherein the first portion is determined based on the respective TTI that each of the plurality of redundant transmissions transmit during.

In an example 30, there is provided a method according to example 25, wherein: the first CTU determined by the RULL-UE for the initial transmission in the first TTI is mapped to a first CTU access region; and the second CTU determined by the RULL-UE for the redundant transmission in the second TTI is mapped to a second CTU access region different from the first CTU access region.

In an example 31, there is provided a reliable ultra-low latency user equipment (RULL-UE) comprising: a hardware processor; and a computer readable storage medium having stored thereon computer readable code for execution by the processor to: implement a reliable ultra-low latency (RULL) transmission mechanism in a default reliable ultra-low latency contention transmission unit (RULL-CTU) mapping scheme, wherein implementing the RULL transmission mechanism comprises: determining a first contention transmission unit (CTU) for an initial transmission in a first transmission time interval (TTI) in accordance with an initial RULL-UE mapping rule and the default RULL-CTU mapping scheme; transmitting, to a base station (BS), the initial transmission on the first CTU during the first TTI; determining a second CTU for a redundant transmission in a second TTI subsequent to the first TTI in accordance with a redundant RULL-UE mapping rule and the default RULL-CTU mapping scheme; transmitting, to the BS, the redundant transmission on the second CTU during the second TTI without receiving, at the RULL-UE, acknowledgement/negative acknowledgement (ACK/NACK) feedback from the BS.

In an example 32, there is provided a RULL-UE according to example 31, wherein determining a second CTU includes determining a plurality of redundant CTUs, each of the redundant CTUs for one of a plurality of redundant transmissions, each redundant transmission in one of a plurality of TTIs subsequent to the first TTI; and wherein transmitting the redundant transmission on the second CTU includes automatically transmitting each of the redundant transmissions on a respective one of the plurality of CTUs during a respective one of the plurality of TTIs.

In an example 33, there is provided a RULL-UE according to example 32, wherein transmitting the redundant transmission on the second CTU comprises automatically transmitting a first portion of the plurality of redundant transmissions, and not transmitting a remaining portion of the redundant transmissions.

In an example 34, there is provided a RULL-UE according to example 33, wherein the first portion is determined based on the respective CTU that each of the plurality of redundant transmissions transmits on.

In an example 35, there is provided a RULL-UE according to example 33, wherein the first portion is determined based on the respective TTI that each of the plurality of redundant transmissions transmit during.

In an example 36, there is provided a RULL-UE according to example 31, wherein: the first CTU determined by the RULL-UE for the initial transmission in the first TTI is mapped to a first CTU access region; and the second CTU determined by the RULL-UE for the redundant transmission in the second TTI is mapped to a second CTU access region different from the first CTU access region.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
configuring a first user equipment (UE), using first high-level signaling, to perform a configured set of uplink grant-free transmissions including an initial uplink grant-free transmission and at least one uplink grant-free redundant transmission irrespective of whether the initial grant-free transmission was successfully received, using time-frequency regions indicated by a first mapping, the first mapping defining first time-frequency regions for the configured set of uplink grant-free transmissions; and
reconfiguring the first UE, using second high-level signaling, to perform the configured set of uplink grant-free transmissions, using time-frequency regions indicated by a second mapping defining second time-frequency regions for the configured set of uplink grant-free transmissions, the second mapping defining at least one time-frequency region different from the first mapping.

2. The method of claim 1, wherein each time-frequency region defined by the first mapping and the second mapping is a contention transmission unit (CTU) access region.

3. The method of claim 2, wherein each CTU access region includes at least one of a pilot or a signature.

4. The method of claim 1, further comprising:
receiving, from the first UE, the configured set of uplink grant-free transmissions over time-frequency regions indicated by the first mapping; and
reconfiguring the first UE using the second high-level signaling after determining a number of collisions between transmissions by another UE and the configured set of uplink grant-free transmissions by the first UE that meets or exceeds a predefined threshold.

5. The method of claim 1, further comprising:
receiving, from the first UE, the configured set of uplink grant-free transmissions over time-frequency regions indicated by the second mapping.

6. The method of claim 1, wherein:
the first mapping defines the first time-frequency regions for uplink grant-free transmissions by a plurality of UEs including the first UE, the first mapping defining a first initial pattern of time-frequency regions for the respective initial uplink grant-free transmission by each of the plurality of UEs and defining a first regrouped pattern of time-frequency regions for the respective at least one uplink grant-free redundant transmission by each of the plurality of UEs; and
the first mapping defines the second time-frequency regions for uplink grant-free transmissions by the plurality of UEs, the second mapping defining a second initial pattern of time-frequency regions for the respective initial uplink grant-free transmission by each of the plurality of UEs and defining a second regrouped pattern of time-frequency regions for the respective at least one uplink grant-free redundant transmission by each of the plurality of UEs, at least one of the first initial pattern or the first regrouped pattern differing from the respective second initial pattern or the second regrouped pattern.

7. A method comprising:
receiving, by a first user equipment (UE), first high-level signaling configuring the first UE to perform a configured set of uplink grant-free transmissions including an initial uplink grant-free transmission and at least one uplink grant-free redundant transmission irrespective of whether the initial grant-free transmission was successfully received, using time-frequency regions indicated by a first mapping, the first mapping defining first time-frequency regions for the configured set of uplink grant-free transmissions; and receiving, by the first UE, second high-level signaling reconfiguring the first UE to perform the configured set of uplink grant-free transmissions, using time-frequency regions indicated by a second mapping defining second time-frequency regions for the configured set of uplink grant-free transmissions, the second mapping defining at least one time-frequency region different from the first mapping.

8. The method of claim 7, wherein each time-frequency region defined by the first mapping and the second mapping is a contention transmission unit (CTU) access region.

9. The method of claim 8, wherein each CTU access region includes at least one of a pilot or a signature.

10. The method of claim 7, further comprising:
transmitting, by the first UE, the configured set of uplink grant-free transmissions over time-frequency regions indicated by the first mapping; and
receiving, by the first UE, the second high-level signaling subsequent to the transmitting.

11. The method of claim 7, further comprising:
transmitting, by the first UE, the configured set of uplink grant-free transmissions over time-frequency regions indicated by the second mapping.

12. The method of claim 7, wherein at least one of the first or the second high-level signaling is a broadcast or multicast signaling.

13. An apparatus comprising:
a processor; and
a non-transitory computer-readable memory storing thereon instructions that, when executed, cause the processor to:
configure a first user equipment (UE), using first high-level signaling, to perform a configured set of uplink grant-free transmissions including an initial uplink grant-free transmission and at least one uplink grant-free redundant transmission irrespective of whether the initial grant-free transmission was successfully received, using time-frequency regions indicated by a first mapping, the first mapping defining first time-frequency regions for the configured set of uplink grant-free transmissions; and
reconfigure the first UE, using second high-level signaling, to perform the configured set of uplink grant-free transmissions, using time-frequency regions indicated by a second mapping defining second time-frequency regions for the configured set of uplink grant-free transmissions, the second mapping defining at least one time-frequency region different from the first mapping.

14. The apparatus of claim 13, wherein each time-frequency region defined by the first mapping and the second mapping is a contention transmission unit (CTU) access region.

15. The apparatus of claim 14, wherein each CTU access region includes at least one of a pilot or a signature.

16. The apparatus of claim 13, wherein the instructions, when executed, further cause the processor to:
receive, from the first UE, the configured set of uplink grant-free transmissions over time-frequency regions indicated by the first mapping; and
reconfigure the first UE using the second high-level signaling after determining a number of collisions between transmissions by another UE and the configured set of uplink grant-free transmissions by the first UE that meets or exceeds a predefined threshold.

17. The apparatus of claim 13, wherein the instructions, when executed, further cause the processor to:
receive, from the first UE, the configured set of uplink grant-free transmissions over time-frequency regions indicated by the second mapping.

18. The apparatus of claim 13, wherein:
the first mapping defines the first time-frequency regions for uplink grant-free transmissions by a plurality of UEs including the first UE, the first mapping defining a first initial pattern of time-frequency regions for the respective initial uplink grant-free transmission by each of the plurality of UEs and defining a first regrouped pattern of time-frequency regions for the respective at least one uplink grant-free redundant transmission by each of the plurality of UEs; and
the first mapping defines the second time-frequency regions for uplink grant-free transmissions by the plurality of UEs, the second mapping defining a second initial pattern of time-frequency regions for the respective initial uplink grant-free transmission by each of the plurality of UEs and defining a second regrouped pattern of time-frequency regions for the respective at least one uplink grant-free redundant transmission by each of the plurality of UEs, at least one of the first initial pattern or the first regrouped pattern differing from the respective second initial pattern or the second regrouped pattern.

19. An apparatus comprising:
a processor; and
a non-transitory computer-readable memory storing thereon instructions that, when executed, cause the processor to:
receive, by a first user equipment (UE), first high-level signaling configuring the first UE to perform a configured set of uplink grant-free transmissions including an initial uplink grant-free transmission and at least one uplink grant-free redundant transmission irrespective of whether the initial grant-free transmission was successfully received, using time-frequency regions indicated by a first mapping, the first mapping defining first time-frequency regions for the configured set of uplink grant-free transmissions; and
receive, by the first UE, second high-level signaling reconfiguring the first UE to perform the configured set of uplink grant-free transmissions, using time-frequency regions indicated by a second mapping defining second time-frequency regions for the configured set of uplink grant-free transmissions, the second mapping defining at least one time-frequency region different from the first mapping.

20. The apparatus of claim 19, wherein each time-frequency region defined by the first mapping and the second mapping is a contention transmission unit (CTU) access region.

* * * * *